US010089191B2

(12) United States Patent
McKelvie et al.

(10) Patent No.: US 10,089,191 B2
(45) Date of Patent: Oct. 2, 2018

(54) SELECTIVELY PERSISTING APPLICATION PROGRAM DATA FROM SYSTEM MEMORY TO NON-VOLATILE DATA STORAGE

(71) Applicant: Amazon Technologies, Inc., Reno, NV (US)

(72) Inventors: Samuel James McKelvie, Seattle, WA (US); Yan Valerie Leshinsky, Kirkland, WA (US); Ian P. Nowland, Seattle, WA (US); Darin Lee Frink, Seattle, WA (US); Anurag Windlass Gupta, Atherton, CA (US); Adam Douglas Morley, Seattle, WA (US); Christopher Nathan Watson, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/949,644

(22) Filed: Nov. 23, 2015

(65) Prior Publication Data

US 2016/0077930 A1    Mar. 17, 2016

Related U.S. Application Data

(63) Continuation of application No. 13/872,530, filed on Apr. 29, 2013, now Pat. No. 9,195,542.

(51) Int. Cl.
*G06F 11/14* (2006.01)
*G06F 12/00* (2006.01)
(Continued)

(52) U.S. Cl.
CPC .......... *G06F 11/1469* (2013.01); *G06F 3/065* (2013.01); *G06F 3/0619* (2013.01);
(Continued)

(58) Field of Classification Search
CPC ............... G06F 11/142; G06F 11/1469; G06F 12/0246; G06F 11/14; G06F 11/1402;
(Continued)

(56) References Cited

U.S. PATENT DOCUMENTS

| | | | |
|---|---|---|---|
| 7,724,643 B2 * | 5/2010 | Kakihara | G06F 11/1441 711/111 |
| 8,209,290 B1 * | 6/2012 | Dowers, II | G06F 17/30289 707/640 |

(Continued)

FOREIGN PATENT DOCUMENTS

| | | |
|---|---|---|
| CN | 102568566 | 7/2012 |
| EP | 1277115 | 1/2003 |

(Continued)

OTHER PUBLICATIONS

U.S. Appl. No. 13/872,530, filed Apr. 29, 2013, Samuel James McKelvie et al.

(Continued)

*Primary Examiner* — Aracelis Ruiz
(74) *Attorney, Agent, or Firm* — Robert C. Kowert; Meyertons, Hood, Kivlin, Kowert & Goetzel, P.C.

(57) ABSTRACT

Application program data stored in system memory may be selectively persisted. An indication may be provided to an application program that an application data object or a range of application data stored in system memory may be treated as persistent. Data backup may be enabled for the application data object or range of application data in the event of a system failure, copying the application data object or range of application data from system memory to non-volatile data storage. Upon recovery from a system failure, further data backup for the application data object or the range of application data may be disabled. In some embodiments, at least some of the application data object or range of application data may be recovered for the application (Continued)

program to access. Data backup for the application data object or the range of application data may also be re-enabled.

20 Claims, 7 Drawing Sheets

(51) Int. Cl.
  *G06F 12/02* (2006.01)
  *G06F 3/06* (2006.01)
(52) U.S. Cl.
  CPC ............ *G06F 3/0688* (2013.01); *G06F 11/14* (2013.01); *G06F 11/1402* (2013.01); *G06F 11/1441* (2013.01); *G06F 11/1451* (2013.01); *G06F 12/0246* (2013.01); *G06F 2201/84* (2013.01)
(58) Field of Classification Search
  CPC ............ G06F 11/1441; G06F 11/1451; G06F 3/0619; G06F 3/065; G06F 3/0688; G06F 2201/84
  See application file for complete search history.

(56) References Cited

U.S. PATENT DOCUMENTS

| | | | |
|---|---|---|---|
| 8,677,037 B1* | 3/2014 | Karamcheti | G06F 13/1657 710/62 |
| 2003/0028736 A1 | 2/2003 | Berkowitz et al. | |
| 2007/0078940 A1 | 4/2007 | Fineberg et al. | |
| 2007/0143299 A1 | 6/2007 | Huras et al. | |
| 2009/0172325 A1 | 7/2009 | Yoshii et al. | |
| 2010/0235594 A1* | 9/2010 | Heller | G06F 12/0246 711/162 |
| 2011/0113208 A1 | 5/2011 | Jouppi et al. | |
| 2012/0096311 A1 | 4/2012 | Bodrner et al. | |
| 2012/0159106 A1 | 6/2012 | Piccirillo et al. | |
| 2012/0317382 A1 | 12/2012 | Steed | |

FOREIGN PATENT DOCUMENTS

| | | |
|---|---|---|
| JP | H11167794 | 6/1999 |
| JP | 2010224732 | 10/2010 |
| WO | 2012083308 | 6/2012 |

OTHER PUBLICATIONS

Adrian Proctor, "Non-Volatile Memory: Non Volatile Memory and its use in Enterprise Applications", 2012 Whitepaper downloaded from http://www.vikingtechnology.com/sites/default/files/featuredvideos/NVDIMM_Technology.pdf, p. 1-8.
International Search Report and Written Opinion from PCT/US14/35904, Issue Sep. 18, 2014, pp. 1-16.
Japanese Office Action and English Translation from Patent Application No. 2016-510830, dated Dec. 27, 2016, Amazon Technologies, Inc., pp. 1-5.
Chinese Office Action from Application No. 201480024007.5, dated May 4, 2017, Amazon Technologies, Inc., pp. 1-16.

* cited by examiner

210 Data Backup Enabled

220 System Failure

230 Upon System Recovery

240 Recover Data

250 Data Backup Re-enabled

SELECTIVELY PERSISTING APPLICATION PROGRAM DATA FROM SYSTEM MEMORY TO NON-VOLATILE DATA STORAGE

This application is a continuation of U.S. patent application Ser. No. 13/872,530, filed Apr. 29, 2013, now U.S. Pat. No. 9,195,542, which is hereby incorporated by reference herein in its entirety.

BACKGROUND

As application programs continue to provide various services and functions that handle increasing amounts of data and/or assist in the managing of systems or solving problems of growing complexity, the more users, clients, organizations, and entities depend upon these application programs to provide these services and functions in a reliable manner. In order to increase the reliability of application programs various technologies have been developed to recover more quickly from service interruptions. One way to minimize these service interruptions is to provide for system memory data backup, which allows system memory to be preserved in the event of a system failure. Upon restart of the system, application programs may more quickly gain access to data and other information restored from data backup. However, without the development of more sophisticated techniques for utilizing data backup technology, unintended consequences may neutralize the benefits application programs may receive from data backup.

Figure 1:
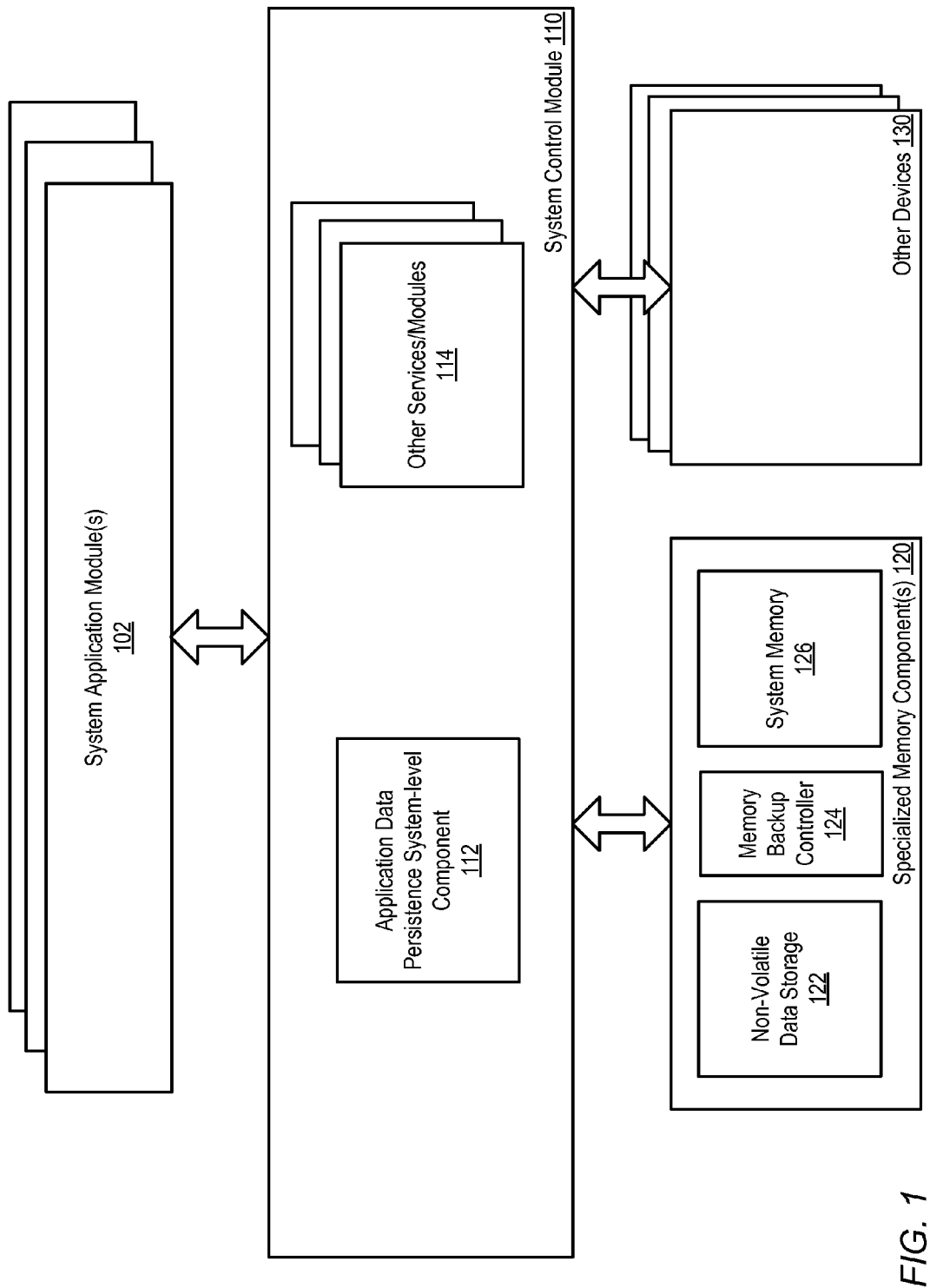
FIG. 1 is a block diagram illustrating an example operating environment for a system-level component configured to implement selectively persisted application program data from system memory to non-volatile data storage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of selectively persisted application program data from system memory to non-volatile data storage are described herein. Typical computing systems implement system memory on one or more random access memory devices. This implementation of system memory (sometimes referred to as "main memory") may allow a central processing unit to quickly access the one or more memory devices in a random order for application program processes operating on application program data. Generally, random access memory devices may not persist data after loss of power or some other form of system failure (referred to often as "volatile" memory). Thus, any application program data stored in the random access memory device may be lost. Upon restart, the random access memory devices may have to be reloaded with data from some other memory storage device, such as an electrically erasable programmable read only memory (EEPROM) which may store bios data to direct the restart of the system. To prevent the loss of application program data, secondary storage that does not lose data upon a system failure, such as a hard disk drive, may be utilized for storing one or more portions of application data, for example, periodically. However, even a system that does backup data from the system memory on the random access memory devices may not be able to ensure complete persistence of application program data, leading to the development of newer random access memory technologies that provide non-volatile (i.e., data persistence) memory functionality while retaining the other qualities of random access memory, such as direct addressability and quick access.

To provide non-volatile random access memory for application programs and other components, programs, or devices that utilize system memory, a variety of different random access technologies have been configured to communicate with a non-volatile data storage device, such as flash-based non-volatile data storage. These hybrid devices may be generally referred to as "non-volatile RAM." A volatile data storage device, such as dynamic random access memory (DRAM), or static random access memory (SRAM), in addition to countless varieties of these and other random access memory technologies, including, but not limited to dual in-line memory module (DIMM), synchronous dynamic random access memory (SDRAM), double data rate synchronous random access memory (DDR-SDRAM), etc. may be configured to communicate with a non-volatile storage electronic storage device, such as a flash-based memory device, electronically programmable read only memory (EPROM), EEPROM (mentioned above). These hybrid devices, (e.g., non-volatile dual inline memory modules (NV-DIMMs)) may include a power source, such as a supercapacitor or other power storage device (e.g., a battery), that allows a memory controller or other component to backup data from the volatile data storage device (RAM) to non-volatile data storage, such as flash-based memory. As a variety of volatile memory technologies, such as different random access memory technologies as well as a variety of different non-volatile memory technologies, are well-known to those of ordinary skill in the art, the above examples are not intended to be limiting. Please also note that a common nomenclature used to refer to flash-based memory technologies is "NVRAM." In order to prevent confusion, hereinafter the specification will only refer to flash-based memory technologies as "flash-based memory technologies."

Computing systems or devices that implement non-volatile RAM or similar configurations of components or devices may be able to persist application program data. However, as noted above such technologies implemented alone may not be sufficient to ensure the persistence of application program data stored in system memory. Typical non-volatile RAMs backup data stored in volatile electronic storage device (e.g., the RAM) at the occurrence of a system failure. The backed up data is then restored the volatile electronic storage device so that system processing may resume. In the event of another system failure during which, for example, power on self tests (POST) or other startup routines performing memory tests and writing garbage values to RAM are performed, then the previously backed up data may be overwritten and thus lost to the application program or other user of system memory. In this example, and other similar scenarios, data stored in RAM may still not be truly "non-volatile."

In various embodiments, computing systems or devices may implement selectively persisting application program data from system memory to non-volatile data storage, such that from the application program's perspective, application program data is persisted even when stored in volatile data storage, such as system memory. Application programs may be reconfigured to perform more efficiently, such as by reducing write latency (e.g., by reducing the number of writes to ensure data persistence). FIG. 1 is a block diagram illustrating an example operating environment for a system level component configured to implement selectively persisted application program data from system memory to non-volatile data storage, according to some embodiments.

A system may implement one or more system application modules 102 that perform various tasks, functions and operations on the system, in some embodiments. System application modules 102 may communicate with system control module 110 which may provide one or more different services to support the tasks, functions, and operations of system application modules 102. System control module 110 may implement various modules and/or components, such as application data persistence system-level component 112, to perform these various support tasks as well as to control various system operations. System control module may also communicate with various other modules, such as memory modules 120 and other devices 130.

In various embodiments, a system may be a computing device such as a server, desktop, laptop, mobile device, node or cluster of nodes, or more generally, any computing device, such as computing system 1000 discussed below with regard to FIG. 7. A system may be configured to perform a specific purpose, such as a storage node of a distributed storage system for a database described below with regard to FIG. 6, or may be a general purpose computing system configured to perform a wide range of tasks. A system may implement one or more system application modules 102, in some embodiments. System application modules may be software (e.g., software program or application), hardware (e.g., sensor or some other device), or a combination of both software and hardware (e.g., an embedded system), configured to perform one or more tasks, functions, operations, or services on the system. System application modules 102 may direct the performance of tasks operations on the system, and as a results may use various system resources. For instance, system application modules 102 may perform various calculations and processing tasks to implement a variety of different services, from backend systems that support databases, networks, webservices, to user-facing applications that provide graphical user-interfaces to perform document editing, media playback, etc. Please note, that the previous examples are not intended to be limiting as to the wide variety of different possible applications that may be implemented.

As part of performing their tasks, system application modules 102 may have access to one or more locations in system memory, such as system memory 126. Access may include directly addressable storage locations, read, write, or any other type of modification to data stored in system memory 126. This data may be used for performing the various tasks. A variety of different data structures, or other logical arrangements of application data may be used to organize or arranged application data for access by system application modules 102. In some embodiments, accessible data stored in system memory 126 may include application state information, task records or logs, output from application operations, and or any other data that system application modules 102 may wish access to. In some embodiments, system application modules 102 may store frequently accessed data. System control module 110 may use the other services/modules 114, such as an input/output module, to facilitate communication and access between system application modules 102 and system memory 126.

In some embodiments, a system may implement a system control module 110. System control module 110 may be configured to perform services, operations, or tasks, that support system application modules 102. A system module may be configured to manage a system's resources, such as data storage, computational resources (e.g., one or more central processing units (CPUs), or any other modules, components or devices of the system. In at least some embodiments, system control module 110 may be a part of an operating system, such as a part of a kernel, or other program or component that manages communications between hardware and software components of a system, such as facilitating communications between system application modules 102 and system memory 126, or other components of specialized memory component 120, and other devices 130. System control module 110 may be configured to receive and or interpret various signals and indications. For example system control module 110 may be configured to interpret requests for services or operations from system application modules 102, such as system calls or commands or requests formatted according to an Application Programming Interface (API). These indications or commands may then be reformatted or interpreted into a format that may be understood by specialized memory component 120 and other devices 130, such as various input/output devices like input/output devices 1050 described below with regard to FIG. 7, or scheduled to be performed by these other devices 130, such as one or more processors like processors 1010 described below with regard to FIG. 7.

Various other services or modules 114 may be implemented by system control module 110 to perform these tasks. For example, other services or modules 114 may together perform process management to allocate system resources, enable sharing and information exchange, protect system resources of each process from other processes, and as well as synchronize processes in order to support the various processes, tasks, and/or functions of system application modules 102 and other programs, modules or components of the system. Memory management, such as providing an interface with specialized memory component 120, system memory 126, and other data storage, such as data storage 1035 discussed below with regard to FIG. 7, may also be provided. Other services or modules 114 may also be implemented by system control module 110 to manage and interface with other devices 130. As these functions and services are well-known to those of ordinary skill in the art, the previous description is not intended to be limiting as to the various other means, ways, or arrangements of providing these services and functions. For example, microkernels, exokernels, and other various operating system or other system control arrangements may be envisioned as well.

In some embodiments, system control module 110 may implement an application data persistence system-level component 112. Application data persistence system-level component 112 may be configured to interact with the various other services or modules 114 in addition to specialized memory component 120 and other devices 130. Application data persistence system-level component 112 may be configured to enable, disable, and re-enable data backup for a range of data stored in system memory 126 for system application module 102 or an application data object stored in system memory 126 for system application module 102, as well as direct the recovery of application data objects or ranges of application from non-volatile data storage 122 to system memory 126. FIGS. 3 through 6 discussed below provide examples of the various techniques and methods that may be implemented by application data persistence system-level component 112.

Determinations as to when to enable, disable, and re-enable data backup, as well as direct recovery, may be made at data persistence system-level component 112. A request from system application module 102, for instance, may identify an application data object or a range of application data to be persisted. Alternatively, determinations may be made in response to an indication that an application data object or range of data has been written to, stored, or otherwise modified. An indication may be provided to system application module 102 that the application data object or range of application data may be treated as persistent. For example, in some embodiments, when an application data object (e.g., a log, record, table, or more generally any kind of data or data structure holding data that is utilized by system application module 102) is created, allocated, or set aside for use, application data persistence system level component 112 may provide an indication to system application module 102 that the application data object may be or can be treated as persistent and enable data backup for the application data object in the event of a system failure. Similarly, a range of application data (e.g., a range of virtual memory addresses, a logical structure for application data such as a data structure, etc.) stored in system memory for system application module 102 may also be created, allocated, or set aside for use, and application data persistence system-level component 112 may provide a similar indication to system application module 102 that the range of application data can be treated as persistent and enable data backup for the range of application data in the event of a system failure. In at least some embodiments, determinations of when to indicate persistence, enable, disable, re-enable data backup, as well as direct recovery, may be made independently for different application data objects accessed by one or more different system application modules 102. For example, two system application modules may each access a different application data object stored in system memory. A request to treat the application data object as persistent may be received for each application data object at different times. Each system application module may also perform different application-driven recovery and request the direction of recovery of backed up data from an application data object in non-volatile storage at different times. Similarly, the recovery of the individual system application modules may occur independently and, thus, requests to re-enable data backup for the application data objects may also be received and performed at different times.

Application data persistence system-level component 112 may obtain information from a variety of sources to make these various determinations. One or more other services or modules 114, for instance, which handle input and output (e.g., reads and writes) from system application modules 102 to system memory 126 may provide various indications to application data persistence system-level component 112 in order to determine when to enable, disable, re-enable data backup, as well as direct the recovery of persisted application data objects or ranges of application data to system memory. For example, system-calls offered by an operating system, or various libraries or other collections of services that may provide support for implementing selectively persisting application data from system memory to non-volatile storage, may be used to provide information to application data persistence system-level component 112.

Application data persistence system-level component may also be configured to determine when recovery from system failure has occurred. A system failure may include any loss of power, function, and/or other failure that prevents application software, programs, modules, or components from accessing data in system memory 126 and/or causes data currently stored in system memory 126 to be lost, unusable, erased, or inaccessible. Other services or modules 114 may be configured to notify application data persistence system-level component in the event of a system failure and/or upon recovery from system failure. In at least some embodiments, upon recovery from a system failure, application data persistence module may be configured to disable further data backup for an application data object or a range of application data. In at least some embodiments, further data backup may be disabled for multiple or all application data objects or ranges of application data indicated to an application program, such as system application module 102, that can be treated as persistent.

Figure 5:
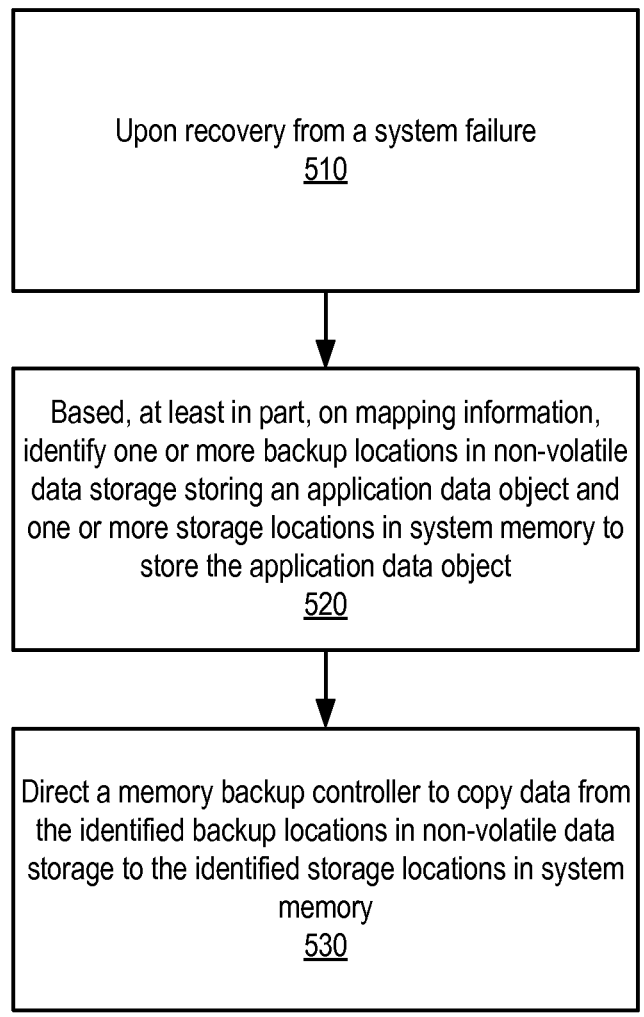
FIG. 5 is a flowchart illustrating a method to direct recovery of an application data object stored in non-volatile data storage, according to some embodiments.

In at least some embodiments, application data persistence system-level component 112 may be configured to direct recovery of at least some of the application data object or range application data, such as from the backup storage locations of the application data object or range application data in non-volatile data storage 122. For example, in at least some embodiments application data persistence system-level component 112 may be configured to direct memory backup controller 124, or some similar component, to copy the application data object or range of application data backed up to non-volatile data storage 122 to one or more locations in system memory 126. In at least some embodiments, these one or more locations may be different from locations where the application data object (or range of application data) was stored in system memory prior to data backup. Thus, in some embodiments, as a result of recovery, from the perspective of system application module 102, it may appear that the application data object or range of application data was preserved in exactly the same state (e.g., same information) as when the system failure occurred. Alternatively, FIG. 5 provides further discussion and examples of techniques to direct the recovery of application data objects or ranges of application data, according to some embodiments, that may be implemented by application data persistence system-level component 112.

Application data objects or ranges of application data stored in system memory 126 may, in some embodiments, be a data structure or some other logical arrangement of application data accessible to an application program, such as system application module 102. To identify an application data object or range of application data, a pointer, index, address, or some other value or indicator may be used to determine the one or more storage locations of the application data object or range of application data in system memory. For example, in at least some embodiments, locations or addresses may be specified as virtual memory addresses, or some other logical descriptors, which may then be translated into one or more physical ranges, locations, addresses, etc. for system memory 126. An indication to enable data backup for an application data object or range application data may, for instance, include a range of virtual memory addresses that are contiguous from the perspective of the system application module 102 which are actually stored in multiple locations physically. Application data persistence system-level component 112, or some other component, may be configured to translate virtual memory addresses specified in the indication to enable data backup into the actual physical locations where the specified range of data is stored in system memory 126.

Figure 4:
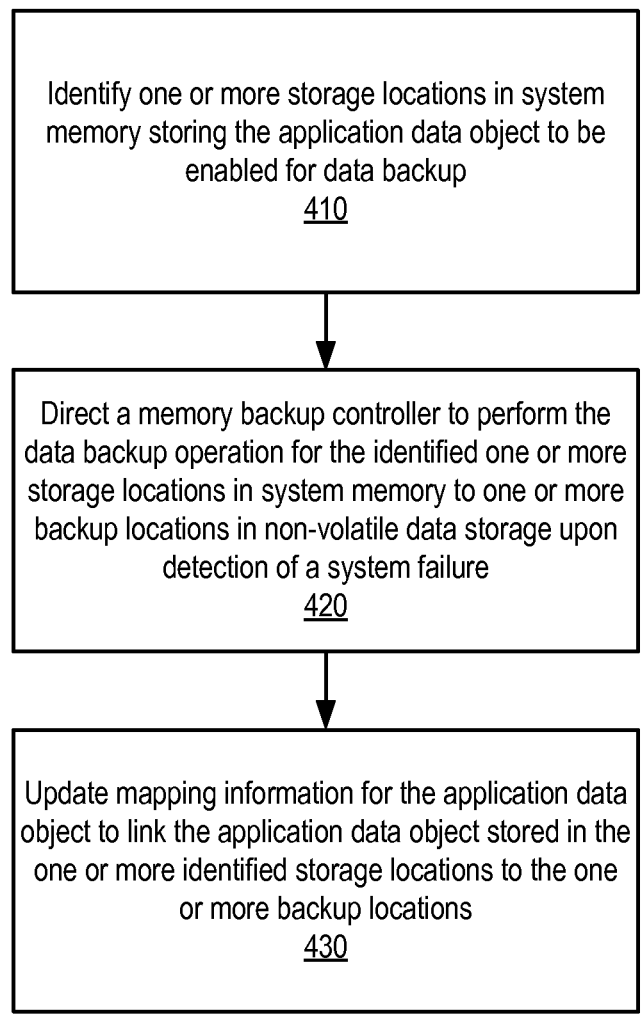
FIG. 4 is a flowchart illustrating a method to selectively enable data backup for an application data object stored in system memory, according to some embodiments.

In some embodiments, application data persistence system-level component 112 may be configured to communicate with specialized memory component 120. Application data persistence system-level component may communicate via protocols defined in a device driver, library, or other type of interface with specialized memory component 120. Requests to enable, disable, and re-enable data backup operations for an application data object or range of application data stored in system memory 126 may be sent to specialized memory component 120. These requests may be directed specifically to a controller or other component, such as memory backup controller 124. As illustrated in FIG. 4, these requests or directions to enable or disable data backup may include specific storage locations in system memory 126 from which to copy data for backup to non-volatile storage 122. In some embodiments, further instructions, such as whether a data encryption schema should be applied to data, may also be included. Application data persistence system-level component 112 may be configured to receive acknowledgements or other confirmations that its various requests have been received.

As noted above, application data persistence system-level component 112 may, in some embodiments, be configured to enable, disable, and re-enable data backup for multiple application data objects or ranges of application data stored in system memory 126. Mapping information, such as in a table or other data structure may be maintained for each of these application data objects or ranges of application data that links storage locations for these application data objects or ranges of application data in system memory 126 to backup storage locations in non-volatile data memory 122. The current backup enablement status, whether enabled or disabled, may also be included in mapping or other status information for the persisted application data objects or ranges of application data for system application modules 102. Enabling, disabling, and re-enabling data backup for each of these multiple application data objects (or ranges of application data) may update the mapping information to reflect the current state of data backup for the respective application data object (or range of application data).

In at least some embodiments, application data persistence system-level component 112 may be configured to facilitate "out-of-band" access to non-volatile data storage 122 to read data backed up from system memory 126. In some embodiments, data may be read directly from non-volatile data storage 122. For example, upon recovery from a system failure application data persistence system-level component 112 may mount a non-volatile data storage 122 as a storage device visible to system application module 102. System application module 102 may then perform various recovery operations, such as reading portions or all of the data from the application data object (or range of application data) stored in non-volatile data storage 122 and creating new application data objects or filling new ranges of application data for access and/or subsequent use by system application module 102. Similarly, in other embodiments, application data persistence system-level component 112 may interact with other services or modules 114, such as an input/output module, to provide direct or "out-of-band" access to the backed up data in non-volatile data storage 122.

In some embodiments, data persistence system-level component 112 may be implemented to facilitate part of an application programming interface (API) offered by system control module 110. For example, data persistence system-level component 112 may be configured to provide an indication to system application module 102 that an application data object or range of application data stored for the system application module is can be treated as persistent. This indication may be generated in response to a request from system application module 102 that conforms to the API for selectively persisting application data stored in system memory. In at least some embodiments, application data persistence system-level component 112 may be configured to interact with various other systems, applications, programs, or components to facilitate selectively enabling data persistence for application data from system memory to non-volatile data storage. For example, application data persistence system-level component 112 may modify or disable various portions of a system BIOS or other component to prevent the overwriting of restored application data objects or ranges of application, such as by a startup memory test or other boot process.

A specialized memory component 120 may also be implemented as part of a system, in some embodiments. Specialized memory component 120 may be one of the various hybrid storage devices discussed above that incorporate system memory, such as system memory 126, configured to communicate with a non-volatile data storage 122, such as flash-based non-volatile data storage, via a memory controller, such as memory backup controller 124. Specialized memory component 120 may be configured to perform various data backup and recovery operations, copying data stored in system memory 126 to non-volatile data storage 122, or vice versa, in response to detecting system failures and upon recovery from system failures.

Figure 2:
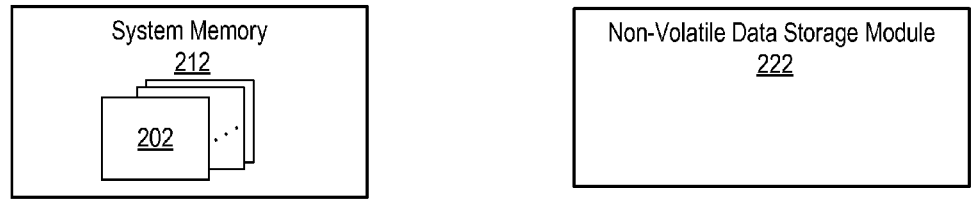
FIG. 2 illustrates a series of block diagrams demonstrating selectively persisted application program data from system memory to non-volatile data storage, according to some embodiments.
Figure 2:
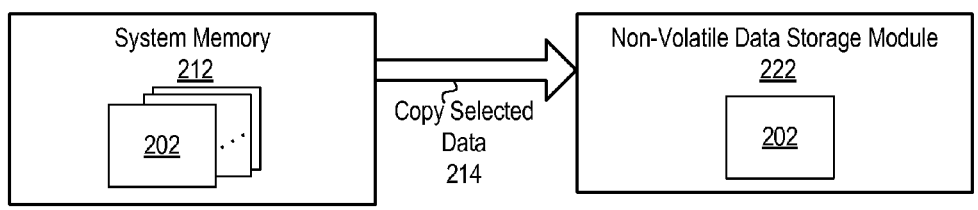
Figure 2:
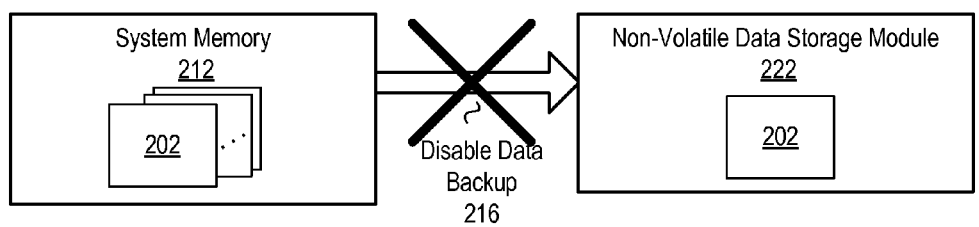
Figure 2:
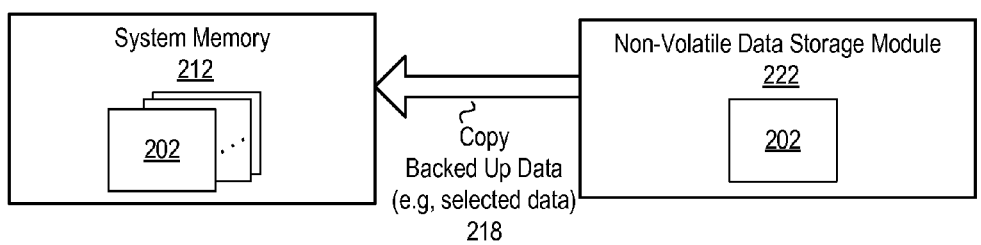
Figure 2:

System memory 126 which may be any one of various types of random access memory, such as those examples discussed above, including, but not limited to, dynamic random access memory (DRAM), or static random access memory (SRAM), in addition to countless varieties of these and other random access memory technologies, including, but not limited to dual in-line memory module (DIMM), synchronous dynamic random access memory (SDRAM), double data rate synchronous random access memory (DDR-SDRAM), etc. System memory 126, may store program instructions to be executed by one or more processors, such as those described below with regard to FIG. 7. System application modules 102 may be one or more application programs that are stored and executed in system memory 126. Application data objects or ranges of application data, as noted above, may also be stored in system memory 126 and used by system application modules 102 to perform various services, tasks, and/or functions. System memory 126 may be implemented by multiple random access memory devices. Although not illustrated in FIG. 2, in at least some embodiments, some of the random access memory devices may not be backed by non-volatile data storage 122 or controlled or accessed by memory backup controller 124. Therefore the illustration of system memory 126 in FIG. 2 is not to be construed as limiting other embodiments, where a portion of system memory 126 may be implemented as part of a specialized memory component 120, and other portions of system memory 126 may be implemented on conventional random access memory technologies. For example, a system may include one NV-DIMM component and one or more additional DRAM components without data backup. Both the volatile data storage on the NV-DIMM component and the one or more additional DRAM components may be used to implement system memory. However, in such an embodiment it may be that only the NV-DIMM implemented portion of system memory may be backed up. As system memory is well-known to those of ordinary skill in the art the previous description is not intended to be limiting as to the various other ways system memory may be implemented and/or utilized.

Memory backup controller 124 may be configured to direct communications between system memory 126 and non-volatile data storage 122. In at least some embodiments, memory backup controller 124 may be configured to perform data backup and restore operations. For example, in at least some embodiments, memory backup controller 124 may detect a system failure. Upon detection of a system failure, memory backup controller 124 may direct the copying of data stored in system memory 126 to non-volatile data storage 122. Similarly, upon recovery from a system failure, memory backup controller 124 may be configured to copy an application data object or range of application data (or a portion thereof) stored in non-volatile data storage 122 back to system memory 126 to recover the application data object or range of application data. The locations to which the backed up data is copied into system memory may differ from the locations from which they were originally backed up from. Various other transformations or manipulations of data may be applied by memory backup controller 124, such as data encryption or decryption.

In at least some embodiments, memory backup controller 124 may be programmable or otherwise configurable by another component, such as application data persistence system level component 112. For example, memory backup controller 124 may be an application specific integrated circuit (ASIC) that is configured to receive various commands to enable various operations, such as enabling or disabling data backup for application data objects or ranges of application data stored in system memory 126. In at least some embodiments, memory backup controller may be programmed, directed, or configured to copy data from specific locations within system memory 126 and non-volatile data storage 122. In some embodiments, memory backup controller 124 may implement various logic and/or data structures to update or maintain information that maps information backed up from system memory 126 to locations in non-volatile data storage 122.

Specialized memory component 120 may also implement non-volatile data storage. As discussed above, in some embodiments, non-volatile data storage may be, for example, flash-based devices, or other persistent storage devices that may be configured to communicate with system memory 126 and capable of storing backed up data. However, as many different types of persistent data storage are well-known to those of ordinary skill in the art, the discussed examples, both above and below, are not intended to be limiting.

Specialized memory component 120 may be one of the general category of devices discussed above known as non-volatile RAM that may include a power source, such as a super-capacitor or other power storage device, that allows a memory controller or other component to backup data from the volatile data storage device (RAM) to non-volatile data storage, such as flash-based memory. Specific examples of such devices may include non-volatile dual in-line memory modules (NV-DIMMs). In at least some embodiments, multiple devices of non-volatile random access memory, such as NV-DIMMs, may be used together. For example, multiple components of volatile data storage may together implement system memory and multiple components of non-volatile data storage may implement may provide storage for data backup operations. In at least some embodiments, non-volatile RAM devices may be mixed with other traditional memory components, such as DRAM or SRAM, implementing system memory, wherein the range of application data or an application data object to be persisted may be stored in the system memory location on the non-volatile RAM device. In some other embodiments, multiple non-volatile RAM devices may be used and may be individually or collectively configured to perform data backup and restore operations. For example, in at least some embodiments, an application data object or range of application data may be a range of the system memory stored on one of multiple non-volatile RAM devices, such as on a single NV-DIMM device. Alternatively, an application data object or range of application data may be stored in system memory implemented across multiple non-volatile RAM devices.

Please note that the various functionalities described above with regard to FIG. 1 are not intended to be limiting as to the various other arrangements, components, or mechanisms that may be used to implement selectively persisting application program data from system memory to non-volatile data storage. For example, the various functions ascribed to application data persistence system-level component 112 may be distributed among a variety of different services, such as an input/output module. Similarly the functions ascribed to memory backup controller 124, may be implemented within system control module 110, or as part of some other device or logic.

FIG. 2 illustrates a series of block diagrams demonstrating selectively persisted application program data from system memory to non-volatile data storage, according to some embodiments. Illustration 210 shows a scenario where data backup may be enabled. As discussed above, a determination to enable data backup for an application data object accessible to an application program that is stored in system memory, such as system memory 212 that stores data including application data object 202, may be made in response to receiving a request or an indication to enable data backup for application data object 202. In this scene, non-volatile data storage 222 as yet does not back up any data for system memory 212.

Between illustrations 210 and 220, various reads, writes, and other additions, subtractions, and/or modifications may be made to application data object 202 in system memory. Illustration 220 shows an occurrence of system failure. Application data object 202 is copied, as indicated at 214, to non-volatile data storage 222 for data backup. As noted above, mapping or other information may also be updated or maintained that indicates the application data object (or range of application data) backed up and the respective one or more storage locations of the application data object in non-volatile data storage 222.

Illustration 230 illustrates that upon system recovery further data backup for application data object is disabled, as indicated at 216. Thus, for example, in the event of a subsequent system failure, application data object 202 in non-volatile data storage 222 may not be overwritten by modifications to application data object 202 in system memory 212, or some other data that may be backed up to non-volatile data storage 222.

Illustration 240 shows that data recovery may be performed. In some embodiments, as illustrated, the application data object may be copied, as indicated at 218, from non-volatile data storage 222 to system memory 212. In at least some embodiments, this copy may be performed automatically. Alternatively, in at least some other embodiments at least some of application data object 202 stored in non-volatile data storage 222 may be recovered in response to requests from an application or direction from another component, such as application data persistence system-level component 112, discussed above with regard to FIG. 1. Additionally, in some embodiments, application data object 202 may be read directly from non-volatile data storage 222 "out-of-band" without performing the illustrated copy 218 to system memory 212.

Illustration 250 demonstrates that data backup may be re-enabled for application data object 202 stored in system memory 212. In the event of system failure, such as illustrated above at 220, application data object 202 may be copied to non-volatile data storage. Please note, that application data object 202 may, as discussed above, not be located in the same locations in system memory as at 210. Moreover, application data object 202 may be a new instantiation of application data object 202 in illustration 210, that is it may be created from data recovered at 240 and may, in some embodiments, not be a replica of the backed up data object 202 in scene 220.

Figure 3:
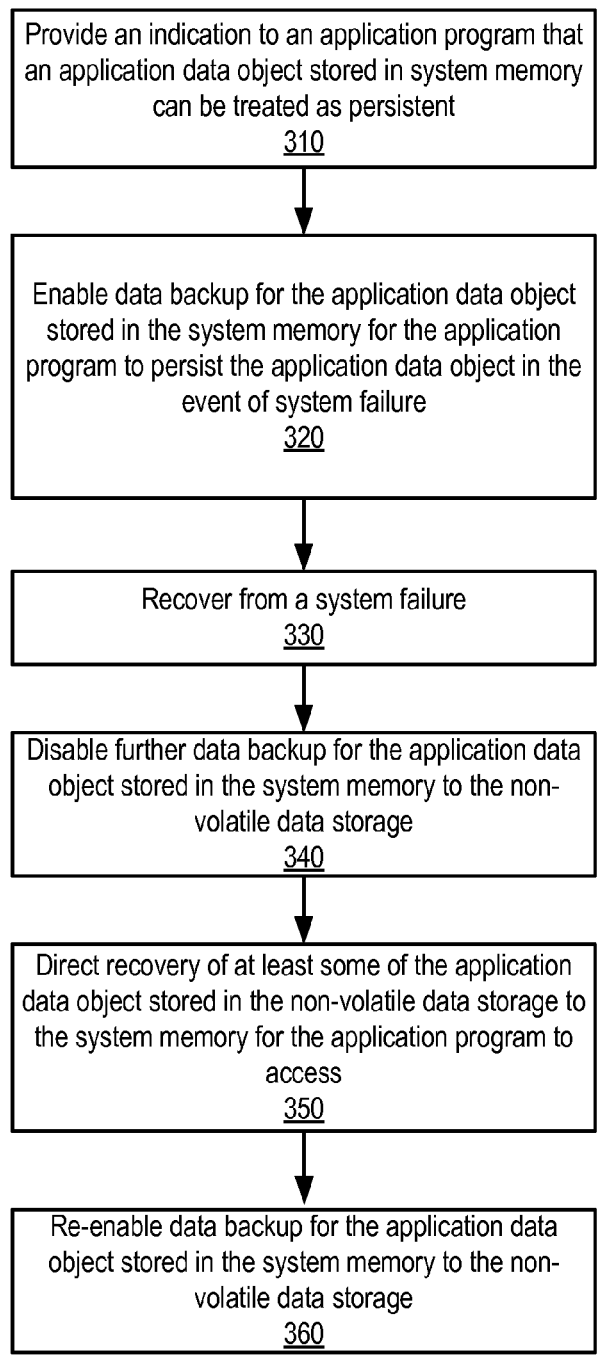
FIG. 3 is a high-level flowchart illustrating a method to implement selectively persisting application program data from system memory to non-volatile data storage, according to some embodiments.

As has been discussed above, application data objects or ranges of application data stored in system memory may be selectively enabled for data backup to non-volatile data storage in the event of a system failure. In at least some embodiments, a system-level component, such as application data persistence system-level component 112 described above with regard to FIG. 1, or more generally any other subsystem or component of a computing device configured to communicate with system memory and non-volatile data storage, such as computer system 1000 described below with regard to FIG. 7, may be used to implement a variety of different techniques for selectively persisting application data from system memory to non-volatile data storage. These various modules and/or devices may be configured to implement the methods and techniques described below. FIG. 3 illustrates a high-level flowchart of an example method to implement selective persistence of application program data from system memory to non-volatile data storage, according to some embodiments.

In various embodiments, as noted above, many different application programs, software, or modules, may be configured to access system memory to perform various tasks. Data may be written or read from the portions of the system memory in order to perform various tasks. Some applications may, for instance, store frequently accessed data in system memory as it may provide for faster access than other storage mediums. These applications may also wish to store data that may need to be persisted (or made durable) in the event of system failure (e.g., power failure). For these application data objects, or ranges of application data, an indication may be provided to the application program that the application data object or range of application data may be treated as persistent, as indicated at 310. Such an indication may be provided upon creation or allocation of the data object or range of data. Additionally, the indication may be provided when writing to or reading from the application data object or range of application data. A request from an application program to persist an application data object or range of application data may also be received.

Data backup for the application data object or range of application data stored in system memory for the application program may be enabled, as illustrated at 310, to persist the application data object or range application data in the event of system failure. As discussed above with regard to FIG. 1, application data objects or ranges of application data may, in some embodiments, be a logical arrangement of application data, such as a data structure, range of storage locations, such as index or address values, for application data stored in system memory. However, in at least some embodiments, the application programs, software, modules, or components may specify locations or addresses which are virtual memory addresses, or some other logical descriptors, which may then be translated into one or more physical ranges, locations, addresses, etc. for the volatile data storage device. For example, the application data object or the range of application data may be a contiguous range of virtual memory addresses that are stored in multiple locations physically.

Data backup may be enabled in a variety of different ways. As discussed above with regard to FIG. 1, a system-level component, such as application data persistence system-level component 112, or some other module or component, may be configured to send one or more requests, signals, or indications to a memory backup controller, such as memory backup controller 124, that may be configured to perform the data backup on the application data object or range of application data stored in system memory. Data backup may, in some embodiments, be enabled by programming or configuring a component to perform data backup for the application data object or range of application data in the event of system failure. FIG. 4 illustrates an example of a method to enable data backup for an application data object, according to some embodiments. One or more storage locations storing the application data object (or range of application data) may be identified, as indicated at 410. For example, a system-level component may understand the addresses defining an application data object or range of application data may be virtual memory addresses. The virtual memory addresses may be translated or otherwise interpreted to locate the one or more physical addresses in system memory that stored the application data object. A memory backup controller, or other component or device, may then be directed to perform the data backup operation for the identified one or more storage locations in system memory to one or more backup locations in non-volatile data storage upon detection of a system failure, as indicated at 420. These backup locations may be predefined, such as all backed up data objects are stored within a particular portion of non-volatile data storage. Alternatively, in some embodiments, the non-volatile data storage device may mirror the system memory and store the application data object in the same locations. Other multiple non-contiguous locations may also be used. For example, some non-volatile electronic storage devices, such as those based on flash technology, implement wear leveling techniques to ensure data writes evenly distributed across the device in order to prolong the life of the device, which may determine backup storage locations for the application data object. Mapping information that links the application data object to its respective storage locations in system memory and in non-volatile data storage may be updated, as indicated at 430. Such mapping information may be maintained at a memory backup controller on a memory device or at a system-level component.

Once enabled, in various embodiments, many different tasks or operations may be performed by the application program, reading, writing, modifying, or otherwise accessing the specified range of data. Upon occurrence of a system failure, the enabled data backup process may copy the application data object or range of application data from system memory to non-volatile data storage. This data backup process may be performed by one or more components, such as memory backup controller 124 discussed above, and may also be performed without the assistance of any external power, logic, or other component. For example, as discussed above memory backup controller 124 may include a separate power source, such as a capacitor or battery, that may enable memory backup controller 124 to perform the copy process in spite of the lack of system or other main power source. The application data object (or range of application data) may be copied to one or more predetermined locations for the data in non-volatile data storage. In some embodiments, application data objects that are enabled for data backup may be copied without copying system memory for which data backup is not enabled. The request to enable data backup or some other indication, request, or communication, may determine a specific location in non-volatile data storage to store the application data object (or range of application data), as noted above in the discussion regarding FIG. 4. Alternatively, some other component or controller for the non-volatile data storage, such as memory backup controller 124, may specify the storage location of the application data object (or range of application data).

In at least some embodiments, enabling data backup from system memory to non-volatile data storage may include an indication or request to encrypt the application data object (or range of application data) as it is copied to non-volatile data storage. Sensitive information, such as financial information, personal data, etc., may be stored by applications in the application data object. An encryption technique, such as symmetric key or public private key schemas, may be applied to the application data object as it is copied from volatile data storage to non-volatile data storage. Upon later access of information, or recovery of information to volatile data storage, the application data object may be decrypted according to the same encryption schema.

In some embodiments, recovery from system failure may occur, as illustrated at 330. System failure may include any loss of power, function, and/or other failure that prevents application software, programs, modules, or components from accessing data in volatile data storage and/or causes data currently stored in volatile data storage to be lost, unusable, erased, etc. System failure may be detected in various ways. For example, a system may employ counters or other components that record the number of times boot program is performed. Other sensors or components may monitor power levels, processors, or other components or devices that may determine if failure has occurred.

Upon recovery from a system failure, further data backup for the application data object stored in system memory to non-volatile data storage may be disabled, as illustrated at 340. In at least some embodiments, disabling data backup may occur prior to any process, such as a boot process, or other startup routine that may modify data stored in the same locations in system memory as the application data object, and may prevent overwrite of any new, modified, or otherwise unrelated data being backed up in the event of a subsequent power failure. Similar to enabling data backup for application data object (or range of application data), as discussed above, disabling data backup for the application data object or range of application data may include sending one or more signals or indications to a memory backup controller, such as memory backup controller 124, that may be configured to perform the data backup on the application data object stored in system memory. Such signals or indications may include the location of the application data object in system memory for which no further data backup is to be performed. Disabling further data backup may, in some embodiments, persist or make durable the application data object that has been backed up to non-volatile data storage in the event of one or more subsequent system failures. Similarly, even if one or more different application data objects may have data backup enabled, and may be copied to non-volatile data storage, the application data object may, in some embodiments, not be overwritten, deleted, or otherwise modified until data backup for the application data object is re-enabled.

In at least some embodiments, recovery of at least some of the application data object (or range of application data) stored in the non-volatile data storage to the system memory for the application program to access may be directed, as illustrated at 350. Recovery of at least some of the application data object may occur via access portions or the whole of backed up memory that have been returned to system memory for the application program to access. FIG. 5 is a flowchart illustrating one such method to direct recovery of an application data object stored in non-volatile data storage, according to some embodiments. Upon recovery from a system failure, as indicated at 510, based, at least in part on mapping information, such as the mapping information discussed above with regard to FIG. 4, one or more backup locations in non-volatile data storage storing the application data object (or range of application data) and one or more storage locations in system memory to store the application data object (or range of application data), may be identified, as indicated at 520. Similar to the discussion above with regard to FIG. 4, non-volatile electronic storage device may store an application data object in multiple locations, such as according to a predefined scheme or according to a technique such as wear leveling. A component external to non-volatile data storage, such as memory backup controller 124 or application data persistence system-level component 112, may determine the backup storage locations. The mapping information which may be maintained for each of the application data objects or range of application data backed up to non-volatile data storage, may store the backup locations, as well as the locations in system memory to which they application data object may be recovered. Mapping information may be maintained in order to maintain the appearance from the application program's perspective that the application data object was persisted in system memory. A memory controller may then be directed to copy data from the identified backup locations in non-volatile data storage to the identified storage locations in system memory, as indicated at 530. Although in some embodiments the entire backed up application data object may be copied to system memory, in at least some other embodiments, partial amounts of data or select portions may be copied.

Applications programs may then access the restored application data object (or range of application data). From the perspective of the application, it may appear that the application data object was persisted in system memory. Restored data may then be used in various ways by the application program, such as to restore the application program to a previous state or determine the state of application program performance when the system failure occurred. For example, the application data object or range of application data may record one or more tasks or operations that the application program was performing when the system failure occurred. The application program may be able to analyze the recorded tasks and determine tasks completed and outstanding tasks, as well as the various results, calculations, or other products of the tasks.

As an alternative to the method described in FIG. 5, in some embodiments, "out-of-band" access to the application data object stored in non-volatile data storage may be provided to an application program. An application program, may thus, perform recovery operations that obtain select portions of the backed up data and for further processing, and may subsequently create a new application data object from the recovered portions of the application data object (which may, in some embodiments, be enabled for data backup). For example, the non-volatile storage may be "mounted" (e.g., like persistent storage device, such as disk drive) and then be accessed by an application program performing recovery operations.

In at least some embodiments, one or more subsequent system failures may be recovered from. As discussed above, system failure may include any loss of power, function, and/or other failure that prevents application software, programs, modules, or components from accessing data in volatile data storage and/or causes data currently stored in volatile data storage to be lost, unusable, erased, etc. However, if data backup for an application data object remains disabled, then a subsequent system failure may merely allow the previously backed up application data object to be restored again. Once disabled, the backed up application data object may be persisted in non-volatile data storage indefinitely in the event of system failure, or until further data backup for the application data object is re-enabled, as illustrated at 360.

In at least some embodiments, data backup for the application data object stored in the system memory may be re-enabled, as illustrated at 360. Re-enabled data backup may, once again, in the event of system failure copy the application data object (or range of application data) from system memory to the non-volatile data storage. As the application may have written to or otherwise modified the data stored in the application data object, data backed up in the event of another power failure may differ from previously backed up data for the application data object. In at least some embodiments, data backed up after previous backups may be stored in different locations in non-volatile data storage so as to persist data stored from previous data backups. Alternatively, in some embodiments, the subsequent backups of data for the same application data object may overwrite the previous data backup stored.

Portions or all of the above described techniques may be repeated for the same or different application data objects or ranges of application data stored in system memory. The various elements may be performed automatically or dynamically in response to various events. The same application data object, for example, may be enabled, disabled, and re-enable multiple times. Additionally, more than one application data object may be enabled or disabled at a time independent of one another. For example, some application data objects may be may be disabled, while others at the same time may be enabled. As such, the ordering of the elements illustrated in FIG. 3 is not intended to be limiting as there are many other possible orderings or configurations of the illustrated elements. Moreover, additional elements may be added or elements removed or modified. FIG. 3 is thus given merely as an example of some of the many possible ways to implement selective persistence of application data from system memory to non-volatile data storage.

Figure 6:
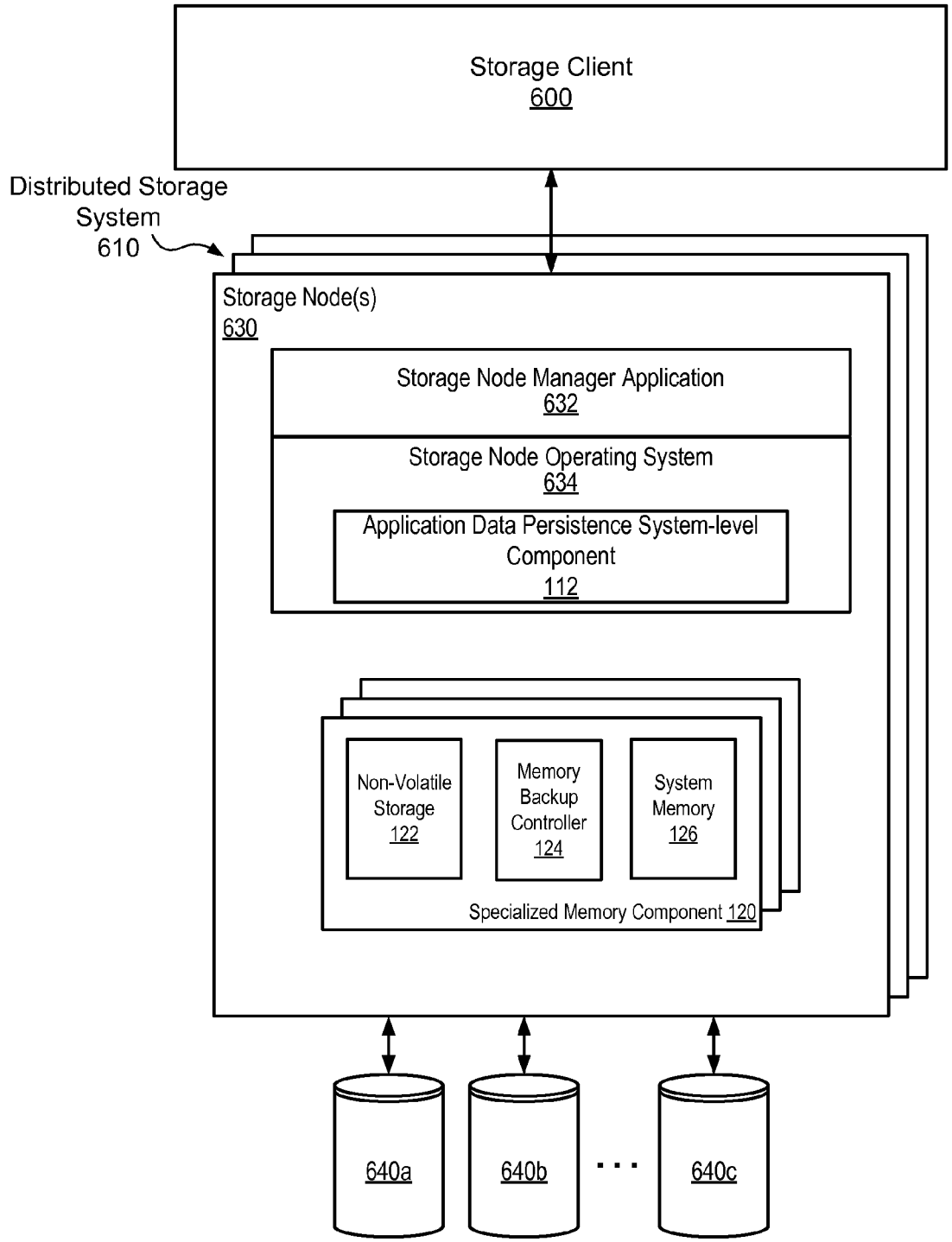
FIG. 6 is a block diagram illustrating an example system that may implement selectively persisted application program data from system memory to non-volatile data storage, according to some embodiments.

FIG. 6 is a block diagram illustrating an example system that may implement selectively persisted application program data from system memory to non-volatile data storage, according to some embodiments. Whereas FIG. 7 discussed below provides a general system upon which various embodiments and techniques may be implemented, FIG. 6 provides a description of an example system directed toward a specific purpose, data storage.

Storage client 600 may be a system or device that manages or maintains data, such as a database system or service implemented on one or more computing devices. Data managed or maintained by storage client 600 may be stored by distributed storage system 610. Distributed storage system 610 may provide a storage service that stores data for the storage client 600. To access data stored by distributed storage system 610, storage client 600 may send one or more access requests to a storage node 630 of distributed storage system 610 that stores data for storage client 600. Storage node 630 may have directly attached storage devices, 640a-640n, that store data for the storage client. Storage node 630 may implement a storage node manager application 632 that processes access requests received from storage client 600 and a storage node operating system 634 that provides services and functions that support the operation of storage node manager application 632.

In some embodiments, storage node manager application 632 may store a transaction log of access requests received at the storage node in an application data object that can be treated as persistent in system memory 126. Application data persistence system-level component 112 may be implemented in storage node operating system 634 to selectively persist the transaction log of access requests. Data backup for the transaction log of access requests may be enabled. Thus, for instance, when acknowledging transactions back to storage client 600, storage node manager application 632 may only need to write the requests to the transaction log in system memory, which may be performed much quicker than persisting the transaction requests in non-volatile data storage prior to returning an acknowledgment of the transaction. Upon recovery from a storage node failure, data backup may be disabled for the transaction log (until re-enabled) and the transaction log of access requests may be restored from non-volatile data storage 122 to system memory 126 via memory backup controller 124, ensuring that the transactions stored in the transaction log may still be persisted.

Embodiments of selectively persisted application data from system memory to non-volatile data storage as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 7:
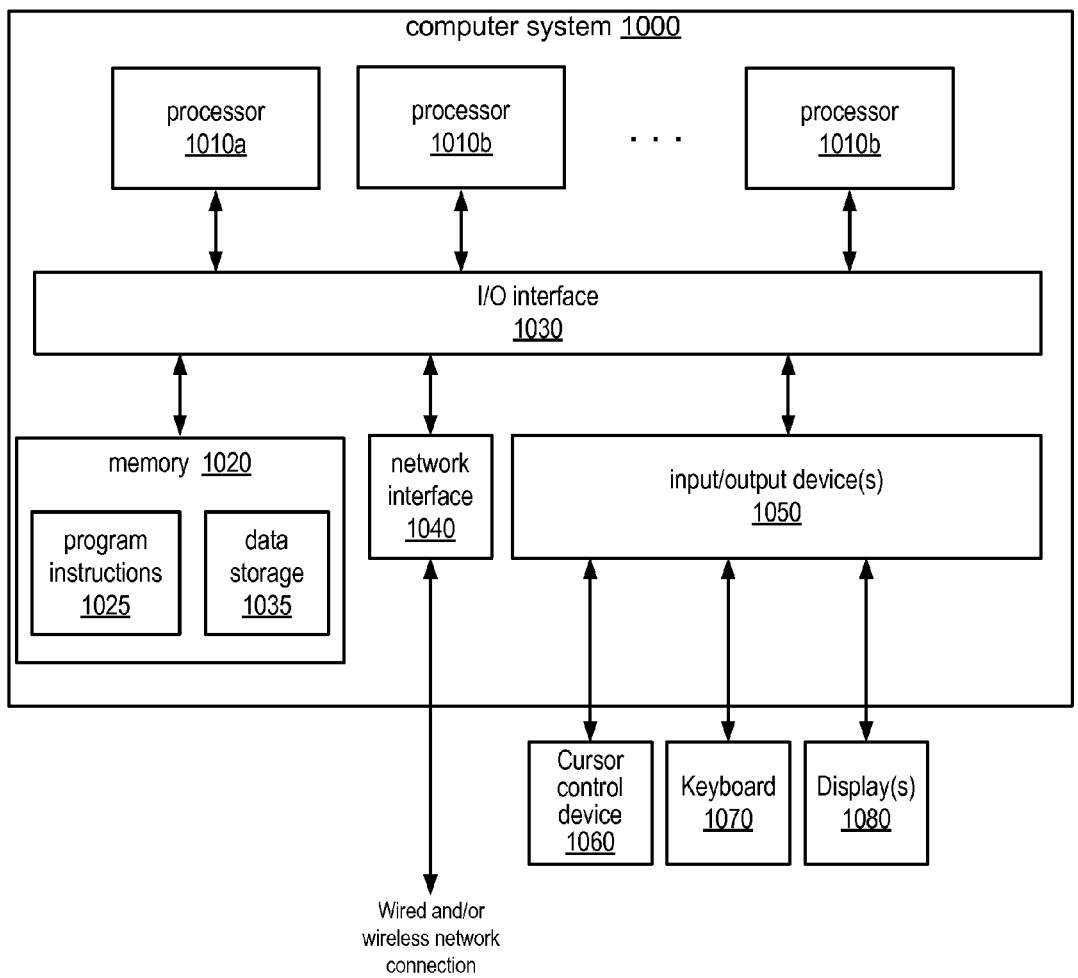
FIG. 7 illustrates an example system, according to some embodiments.

As shown in FIG. 7, memory 1020 may include program instructions 1025, configured to implement the various embodiments of selectively persisted application data from system memory to non-volatile data storage as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
one or more processors;
non-volatile data storage; and a system memory storing program instructions that when executed by the one or more processors implement a memory backup controller, configured to:

before a system failure, receive, via an interface from an application program executing at the one or more processors, a request to persist an application data object stored in the system memory after the system failure; and in response to receipt of the request, enable data backup for the application data object stored in the system memory to copy the application data object for the application program from the system memory to the non-volatile data storage without copying other data in the system memory for which data backup is not enabled after the system failure.

2. The system of claim 1, wherein the memory backup controller is further configured to:

upon recovery from the system failure, direct recovery of the application data object stored in the non-volatile data storage to the system memory for the application program to access.

3. The system of claim 1, wherein the memory backup controller is further configured to:

upon recovery from the system failure, disable further data backup of application data object stored in the system memory to the non-volatile data storage.

4. The system of claim 1, wherein the interface is an application programming interface (API) directing the performance of said enabling by the memory backup controller.

5. A method, comprising:

performing, by a computing device implementing a system:

before a system failure, receiving, via an interface from an application program executing at the computing device, a request to persist an application data object in system memory after the system failure; and in response to receiving the request, enabling data backup for the application data object stored in the system memory to copy the application data object for the application program from the system memory to non-volatile data storage without copying other data in the system memory for which data backup is not enabled after the system failure.

6. The method of claim 5, further comprising:

upon recovery from system failure, disabling further data backup for the application data object stored in the system memory to the non-volatile data storage.

7. The method of claim 5, further comprising performing independently said receiving and said enabling for different ones of a plurality of application data objects for at least one of a plurality of application programs including the application program.

8. The method of claim 5, wherein a memory backup controller directs communications between the system memory and the non-volatile data storage, wherein the interface is an application programming interface (API) directing the performance of said enabling by the memory backup controller.

9. The method of claim 5, wherein said enabling data backup for the application data object stored in the system memory to copy the application data object for the application program from the system memory to the non-volatile data storage after the system failure, comprises:

identifying one or more storage locations in the system memory storing the application data object to be enabled for data backup;

directing the memory backup controller to perform the data backup operation for the identified one or more storage locations in the system memory to one or more backup locations in the non-volatile data storage upon detection of the system failure; and updating mapping information for the application data object to link the one or more identified storage locations for the application data object to the one or more backup locations.

10. The method of claim 9, further comprising:

directing the recovery of at least some of the application data object stored in the non-volatile data storage to the system memory for the application program to access, comprising:

based, at least in part, on the mapping information, identifying the one or more backup locations in the non-volatile data storage storing the application data object and the one or more storage locations in the system memory to store the application data object backed up to the non-volatile data storage; and directing the memory backup controller to copy data from the identified backup locations in non-volatile data storage to the identified storage locations in system memory.

11. The method of claim 10, wherein said enabling data backup for the application data object stored in the system memory to copy the application data object for the application program from the system memory to the non-volatile data storage after the system failure, further comprises directing the encryption of the application data object according to an encryption scheme when copied to the non-volatile data storage;

wherein said directing the recovery of the application data object stored in the non-volatile data storage to the system memory for the application program to access, further comprises directing the decryption of the application data object according to the encryption scheme when copied to the system memory.

12. The method of claim 5, wherein the system memory and the non-volatile data storage together comprise one or more non-volatile dual inline memory modules (NV-DIMMs).

13. A non-transitory, computer-readable storage medium, storing program instructions that when executed by a computing device implements a system configured to implement:

before a system failure, receiving, via an interface from an application program executing at the computing device, a request to persist an application data object in system memory after the system failure;

in response to receiving the request, enabling data backup for the application data object stored in the system memory to the application data object for the application program from the system memory to the non-volatile data storage without copying other data in the system memory for which data backup is not enabled after the system failure.

14. The non-transitory, computer-readable storage medium of claim 13, wherein a memory backup controller directs communications between the system memory and the non-volatile data storage, and wherein the interface is an application programming interface (API) directing the performance of said enabling by the memory backup controller. by the memory backup controller.

15. The non-transitory, computer-readable storage medium of claim 13, wherein the program instructions when executed by the computing device further implements upon recovery from the system failure, disabling further data backup for the application data object stored in the system memory to the non-volatile data storage.

16. The non-transitory, computer-readable storage medium of claim 13, wherein the system memory and the non-volatile data storage together comprise one or more non-volatile dual inline memory modules (NV-DIMMs).

17. The non-transitory, computer-readable storage medium of claim 13, wherein the program instructions when executed by the computing device further implement performing independently said receiving and said enabling for different ones of a plurality of application data objects for at least one of a plurality of application programs including the application program.

18. The non-transitory, computer-readable storage medium of claim 13 wherein, in enabling data backup for the application data object stored in the system memory to copy the application data object for the application programs program from the system memory to the non-volatile data storage after the system failure, the program instructions cause the computing device to implement:
  identifying one or more storage locations in the system memory storing the application data object to be enabled for data backup;
  directing the memory backup controller to perform the data backup operation for the identified one or more storage locations in the system memory to one or more backup locations in the non-volatile data storage upon detection of the system failure; and
  updating mapping information for the application data object to link the one or more identified storage locations for the application data object to the one or more backup locations.

19. The non-transitory, computer-readable storage medium of claim 18, wherein the program instructions cause the computing device to further implement:
  directing the recovery of at least some of the application data object stored in the non-volatile data storage to the system memory for the application program to access, comprising:
  based, at least in part, on the mapping information, identifying the one or more backup locations in the non-volatile data storage storing the application data object and the one or more storage locations in the system memory to store the application data object backed up to the non-volatile data storage; and
  directing the memory backup controller to copy data from the identified backup locations in non-volatile data storage to the identified storage locations in system memory.

20. The non-transitory, computer-readable storage medium of claim 19,
  wherein, in enabling data backup for the application data object stored in the system memory to copy the application data object for the application program from the system memory to the non-volatile data storage after the system failure, the program instructions when executed by the computing device cause the computing device to further implement directing the encryption of the application data object according to an encryption scheme when copied to the non-volatile data storage; and
  wherein, in directing the recovery of the application data object stored in the non-volatile data storage to the system memory for the application program to access, the program instructions when executed by the computing device cause the computing device to further implement directing the decryption of the application data object according to the encryption scheme when copied to the system memory.

* * * * *